(12) United States Patent
Aragona

(10) Patent No.: US 11,191,251 B1
(45) Date of Patent: Dec. 7, 2021

(54) COLLAPSIBLE PET PEN

(71) Applicant: Jeffrey Aragona, Summerville, SC (US)

(72) Inventor: Jeffrey Aragona, Summerville, SC (US)

(*) Notice: Subject to any disclaimer, the term of this patent is extended or adjusted under 35 U.S.C. 154(b) by 378 days.

(21) Appl. No.: 16/417,710

(22) Filed: May 21, 2019

(51) Int. Cl.
*A01K 1/03* (2006.01)
*E01F 13/02* (2006.01)

(52) U.S. Cl.
CPC ............ *A01K 1/034* (2013.01); *E01F 13/028* (2013.01)

(58) Field of Classification Search
CPC . A01K 1/034; A01K 3/00; A01K 1/00; A01K 1/0035; A01K 31/08; E01F 13/028; E04H 15/00; E04H 17/00; E04H 17/127; E04H 17/1413; E04H 17/18
USPC ....... 119/474, 498, 452, 499, 504, 512, 513, 119/514; 4/128, 87; 160/135
See application file for complete search history.

(56) References Cited

U.S. PATENT DOCUMENTS

| 337,192 | A | * | 3/1886 | Peck | ........................ | E06B 9/264 |
| | | | | | | 160/98 |
| 5,029,819 | A | * | 7/1991 | Kane | ........................ | E04H 17/04 |
| | | | | | | 256/24 |
| 5,636,679 | A | * | 6/1997 | Miller | ........................ | E06B 9/08 |
| | | | | | | 160/23.1 |
| 6,092,792 | A | | 7/2000 | Camara | | |
| 6,457,438 | B1 | | 10/2002 | Baker | | |
| 6,553,940 | B1 | | 4/2003 | Powell | | |
| 6,688,256 | B1 | | 2/2004 | King | | |
| 7,217,061 | B2 | * | 5/2007 | Stratton | ..................... | E01F 7/00 |
| | | | | | | 160/24 |
| 7,219,709 | B1 | * | 5/2007 | Williams | ............... | E01F 13/028 |
| | | | | | | 160/24 |
| 7,293,530 | B2 | | 11/2007 | Italiano | | |
| D614,815 | S | | 4/2010 | Co | | |
| 9,107,387 | B1 | | 8/2015 | Pavlik | | |
| 10,794,022 | B2 | * | 10/2020 | Reiner | ..................... | B65H 75/48 |
| 2005/0098770 | A1 | * | 5/2005 | Schell | .................... | E01F 13/028 |
| | | | | | | 256/25 |
| 2005/0173078 | A1 | * | 8/2005 | Perez, Jr. | .................. | A01K 3/00 |
| | | | | | | 160/99 |
| 2006/0131551 | A1 | * | 6/2006 | Hopp | ..................... | E01F 13/028 |
| | | | | | | 256/21 |
| 2006/0151123 | A1 | * | 7/2006 | Chandler | ................... | E06B 9/08 |
| | | | | | | 160/24 |

(Continued)

FOREIGN PATENT DOCUMENTS

WO      2010110899      9/2010

*Primary Examiner* — Yvonne R Abbott-Lewis
(74) *Attorney, Agent, or Firm* — Kyle A. Fletcher, Esq.

(57) ABSTRACT

The collapsible pet pen comprises a screen that may be deployed from within a cannister container and supported by a plurality of support poles. The cannister container and the screen may form a portable fence to confine a pet. Each of the plurality of support poles may comprise a pole body and a pole base. The pole base may be a ground base comprising a stake to push into the ground or a deck base that may be coupled to a deck or other flat surface. The cannister container and the leading edge of the screen may couple to a wall of a building using one or more wall coupler strips. The screen and the plurality of pole may couple to each other via a plurality of screen support fasteners dispersed at equal intervals along the screen and pole support fasteners found on each pole body.

17 Claims, 8 Drawing Sheets

(56) References Cited

U.S. PATENT DOCUMENTS

| | | | | |
|---|---|---|---|---|
| 2007/0176158 | A1* | 8/2007 | Robinson | E01F 13/028 256/12.5 |
| 2007/0193705 | A1* | 8/2007 | Hsu | A47G 5/02 160/238 |
| 2008/0121352 | A1* | 5/2008 | Cheng | E06B 9/08 160/238 |
| 2009/0008042 | A1* | 1/2009 | Snyder | E06B 9/08 160/264 |
| 2010/0301296 | A1* | 12/2010 | Ratzenberger | E01F 13/028 256/24 |
| 2012/0256149 | A1* | 10/2012 | Sylvester | E01F 13/028 256/73 |
| 2013/0221301 | A1* | 8/2013 | Cowie | E04H 17/00 256/24 |
| 2014/0054404 | A1* | 2/2014 | Mitchell | B65H 75/38 242/370 |
| 2014/0318007 | A1* | 10/2014 | Hogan | A01K 1/00 47/39 |
| 2017/0284154 | A1* | 10/2017 | Reiner | E06B 3/4636 |
| 2018/0044868 | A1* | 2/2018 | Miller | E04H 17/00 |

* cited by examiner

US 11,191,251 B1

COLLAPSIBLE PET PEN

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of pet restraint systems, more specifically, a collapsible pet pen.

SUMMARY OF INVENTION

The collapsible pet pen comprises a screen that may be deployed from within a cannister container and supported by a plurality of support poles. The cannister container and the screen may form a portable fence to confine a pet. Each of the plurality of support poles may comprise a pole body and a pole base. The pole base may be a ground base comprising a stake to push into the ground or a deck base that may be coupled to a deck or other flat surface. The cannister container and the leading edge of the screen may couple to a wall of a building using one or more wall coupler strips. The screen and the plurality of pole may couple to each other via a plurality of screen support fasteners dispersed at equal intervals along the screen and pole support fasteners found on each pole body.

An object of the invention is to confine a pet within a fenced area.

Another object of the invention is to form a fence by deploying a flexible screen from within a cannister container.

A further object of the invention is to support the screen using a plurality of support poles.

Yet another object of the invention is to provide support poles for installation into the ground on onto a deck.

These together with additional objects, features and advantages of the collapsible pet pen will be readily apparent to those of ordinary skill in the art upon reading the following detailed description of the presently preferred, but nonetheless illustrative, embodiments when taken in conjunction with the accompanying drawings.

In this respect, before explaining the current embodiments of the collapsible pet pen in detail, it is to be understood that the collapsible pet pen is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the collapsible pet pen.

It is therefore important that the claims be regarded as including such equivalent construction insofar as they do not depart from the spirit and scope of the collapsible pet pen. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
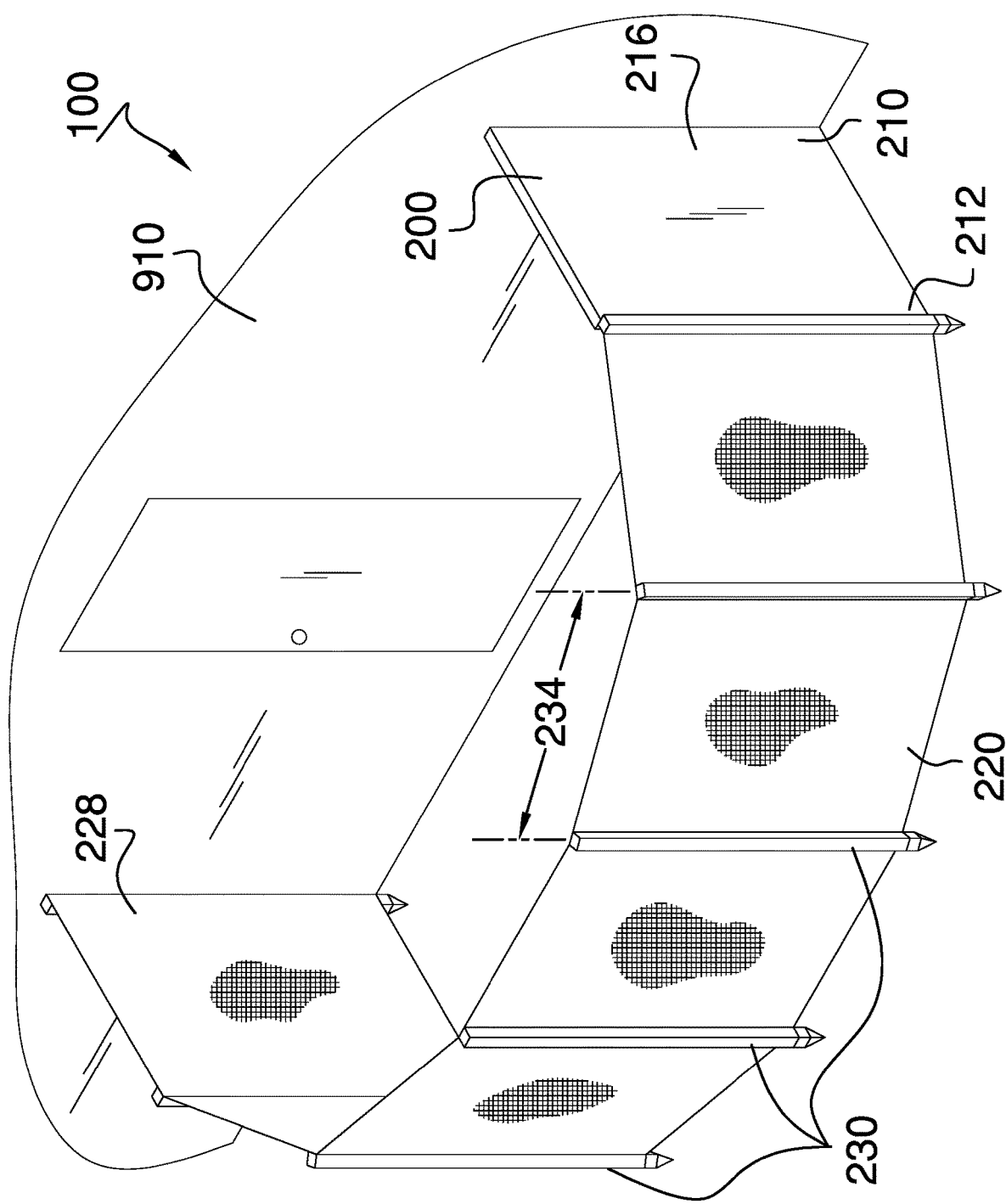
FIG. 1 is a perspective view of an embodiment of the disclosure.
Figure 2:
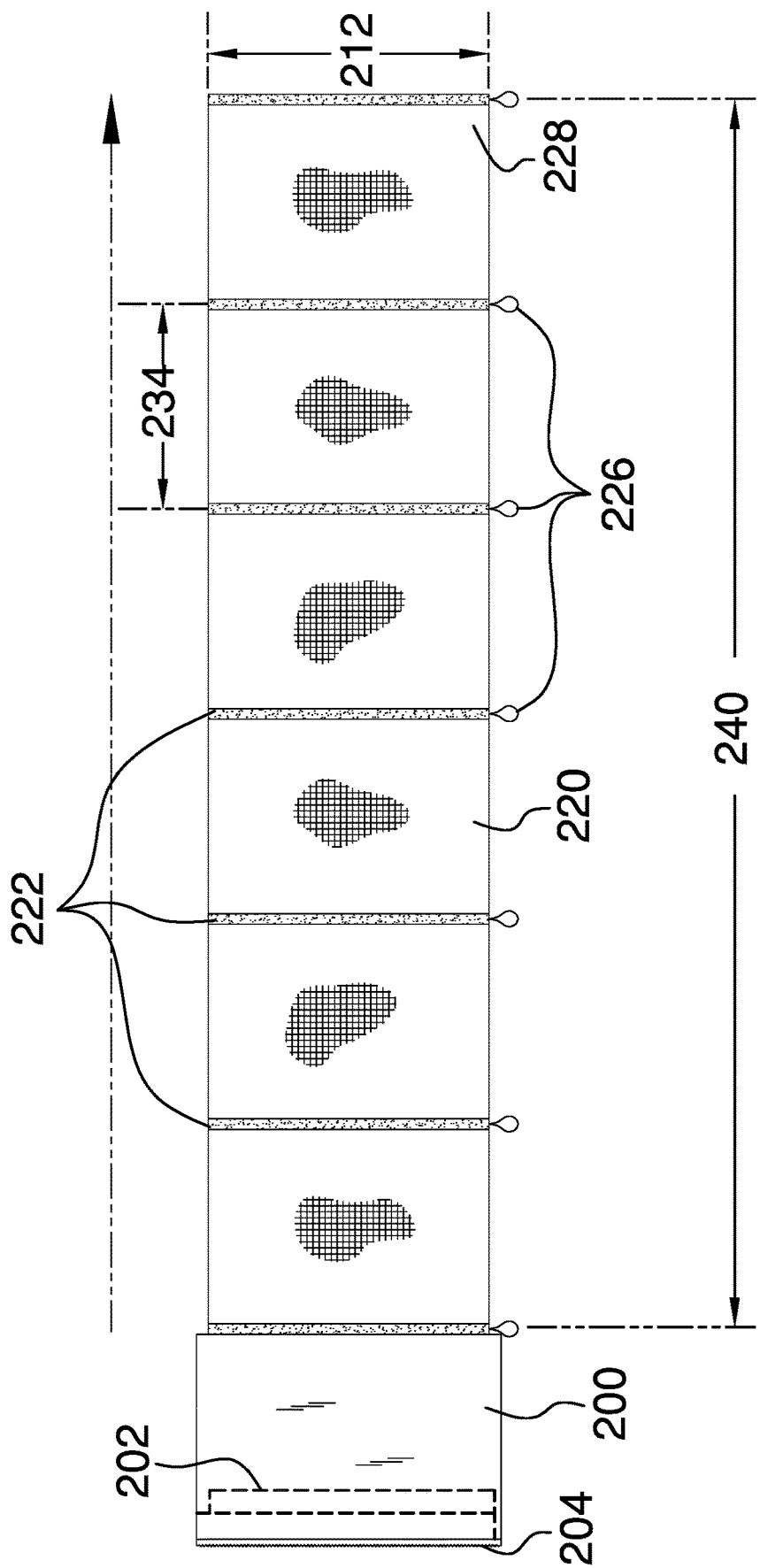
FIG. 2 is a front view of an embodiment of the disclosure.
Figure 3:
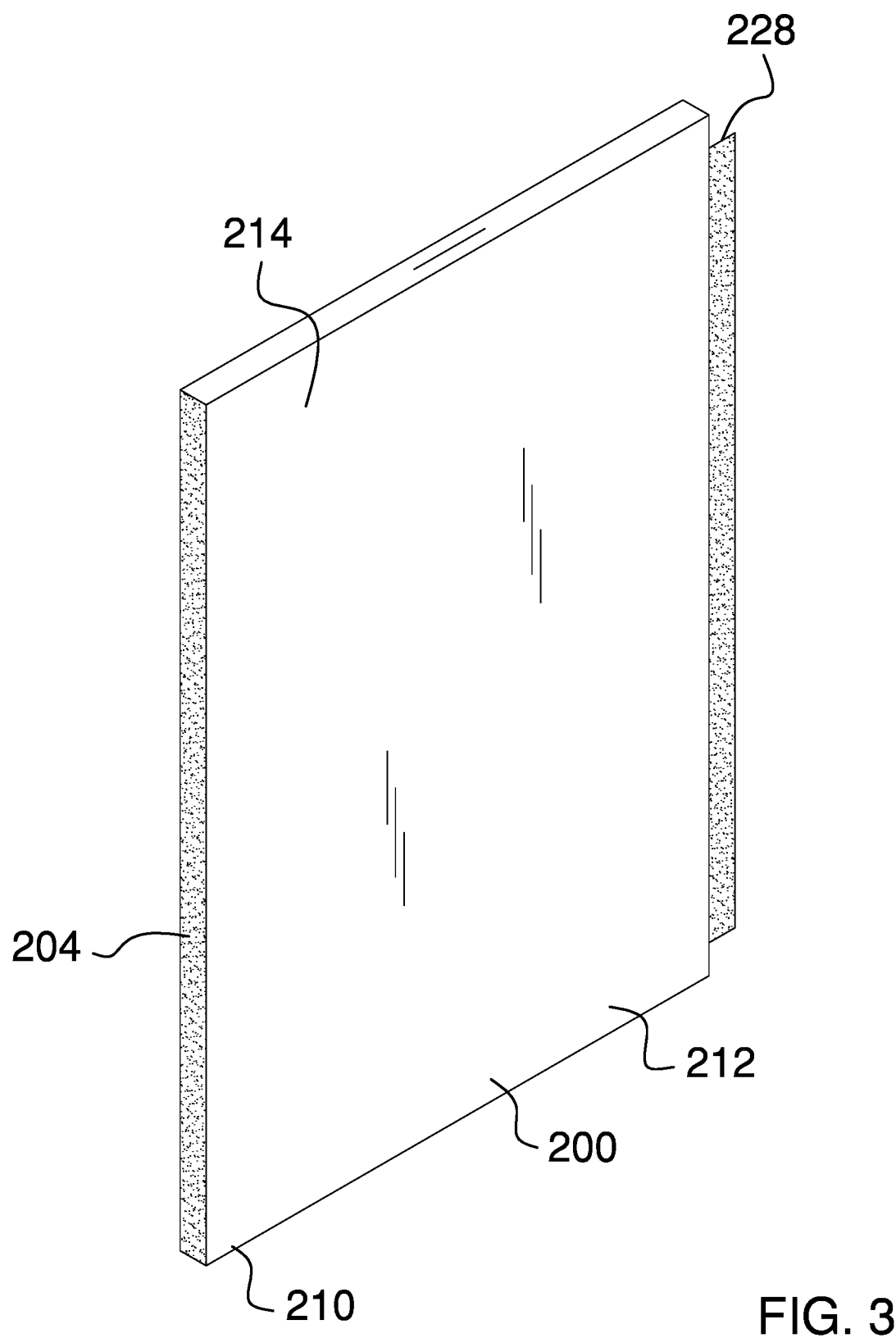
FIG. 3 is a perspective view of an embodiment of the disclosure illustrating the cannister container.
Figure 4:
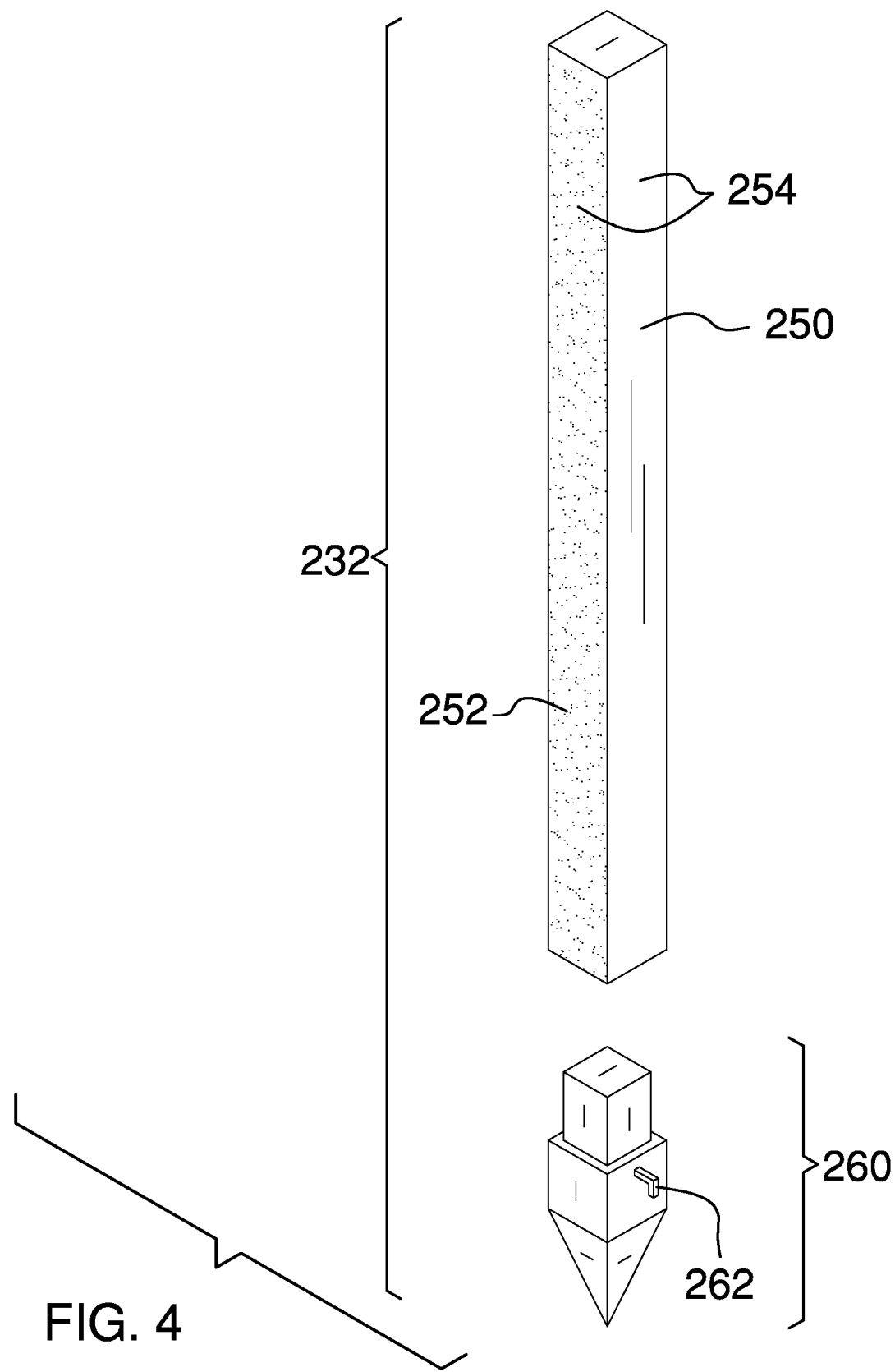
FIG. 4 is a perspective view of an embodiment of the disclosure illustrating a support pole with a ground base.
Figure 5:
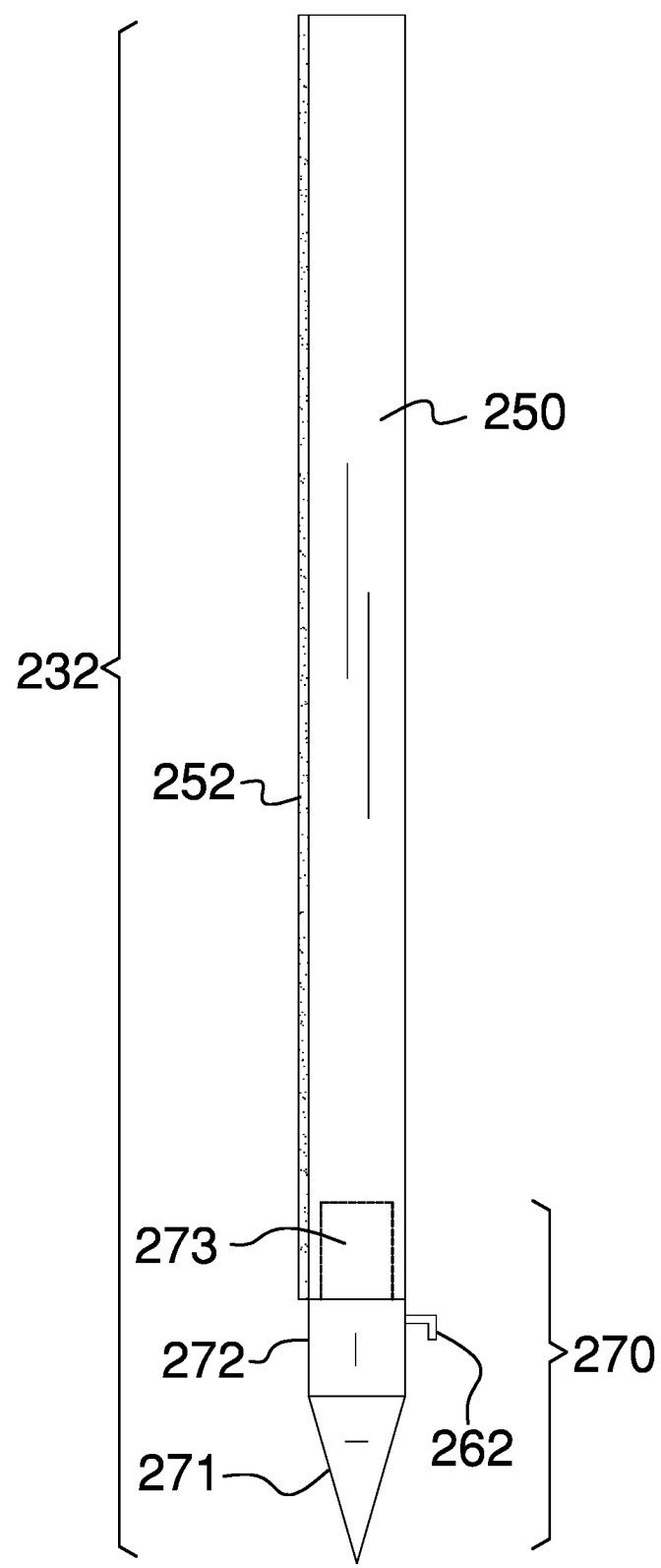
FIG. 5 is a side view of an embodiment of the disclosure illustrating a support pole with a ground base.
Figure 6:
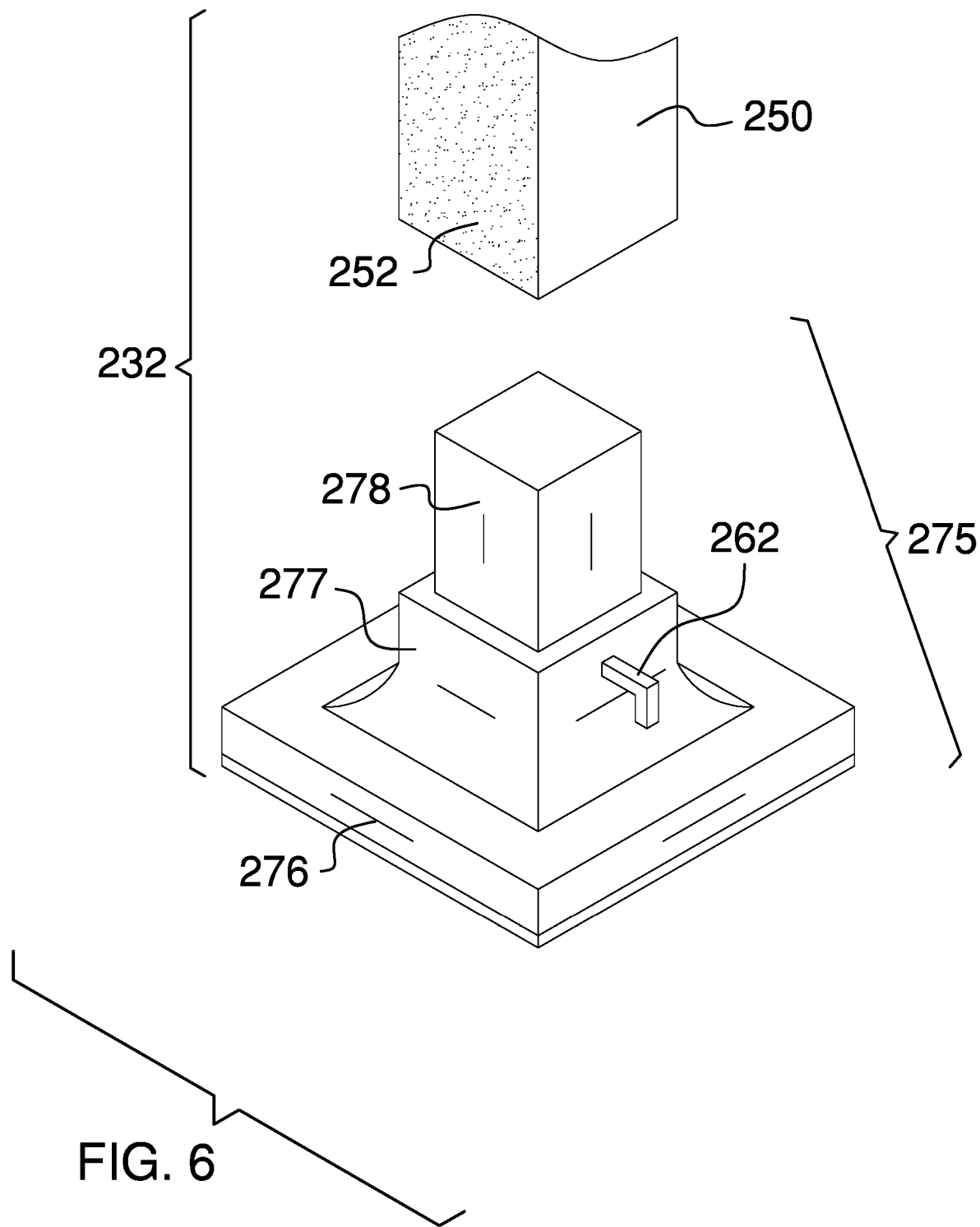
FIG. 6 is a perspective view of an embodiment of the disclosure illustrating a support pole with a deck base.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Detailed reference will now be made to a first potential embodiment of the disclosure, which is illustrated in FIGS. 1 through 8.

The collapsible pet pen 100 (hereinafter invention) comprises a cannister container 200, a screen 220, and a plurality of support poles 230. The screen 220 may be deployed from within the cannister container 200 and supported by the plurality of support poles 230. The cannister container 200 and the screen 220 may be adapted to form a portable fence to confine a pet.

The cannister container 200 may be a panel that houses the screen 220. The cannister container 200 may have the shape of a rectangular prism. The cannister container 200 may comprise a first side panel 214 and a second side panel 216. The cannister container 200 may comprise a first canister end 210 which may be coupled to a container support fastener 204. The cannister container 200 may be held upright by the container support fastener 204 coupling to a wall 910 of a building or to one of the plurality of support poles 230. The cannister container 200 may comprise a second canister end 212 where the screen 220 may exit from the cannister container 200.

A retractor 202 may be housed within the cannister container 200. The retractor 202 may pull the screen 220 intro the cannister container 200 in the absence of an external force pulling the screen 220 out of the cannister container 200. As a non-limiting example, the retractor 202 may be one or more spring-loaded rollers mounted on vertically-oriented axis that tend to wrap the screen 220 around rollers. The cannister container 200 may comprise the retractor 202.

The screen 220 may be a flexible barrier that is vertically-oriented when in use. The screen 220 may be rectangular. The width 240 of the screen 220 may be larger than the height 242 of the screen 220. As non-limiting examples, the screen 220 may be fabric or mesh made from silk, nylon, cotton, Dacron, Kevlar, or combinations thereof. The screen 220 may comprise a plurality of screen support fasteners 222. Each of the plurality of screen support fasteners 222 may be a vertically-oriented coupling location for coupling the screen 220 to one of the plurality of support poles 230.

The plurality of screen support fasteners 222 may be regularly spaced along the width 240 of the screen 220. The spacing between adjacent ones of the plurality of screen support fasteners 222 may be a pole separation distance 234. One of the plurality of screen support fasteners 222 may be located at a leading edge 228 of the screen 220.

The screen 220 may comprise a plurality of loops 226. One of the plurality of loops 226 may be located at the bottom of the screen 220 below each of the plurality of screen support fasteners 222.

The plurality of support poles 230 may be vertically-oriented armatures that support the screen 220 and/or the cannister container 200. The plurality of support poles 230 may be placed in a yard or on a deck to define the area to be enclosed by the screen 220. The plurality of support poles 230 may be separated by the pole separation distance 234 such that one of the plurality of support poles 230 corresponds to each of the plurality of screen support fasteners 222 on the screen 220. The screen 220 couples to the plurality of support poles 230 at each of the plurality of support poles 230. Each individual support pole 232 selected from the plurality of support poles 230 may comprise a pole body 250 and a pole base 260.

The pole body 250 may be as tall as the height 242 of the screen 220. The bottom of the pole body 250 may be coupled to the top of the pole base 260. The pole body 250 may have a square horizontal cross-section. A pole support fastener 252 may be coupled to one or more lateral faces 254 of the pole body 250. The pole support fastener 252 couples to one of the plurality of screen support fasteners 222 on the screen 220.

The pole base 260 may hold the individual support pole 232 in position in a yard or on a deck. The pole base 260 may comprise a hook 262.

In some embodiments, the pole base 260 may be a ground base 270 that may be driven into the ground to the individual support pole 232 in place. The ground base 270 may comprise a stake 271, a ground collar 272, and a ground post adapter 273. The stake 271 may come to a point on the bottom such that the ground base 270 may be driven into the ground. The ground collar 272 may be coupled to the top of the stake 271 and may be wider than the outside of the pole body 250 such that the ground collar 272 prevents the pole body 250 from sliding down past the top of the ground collar 272. The ground post adapter 273 may be coupled to the top of the ground collar 272 and may be substantially the same width as the interior of the pole body 250 such that the ground post adapter 273 may be inserted into the bottom of the pole body 250.

In some embodiments, the pole base 260 may be a deck base 275 that may be coupled to a deck or floor to the individual support pole 232 in place. The deck base 275 may comprise a deck coupler 276, a deck collar 277, and a deck post adapter 278. The deck coupler 276 may have a flat bottom such that the deck base 275 may rest of the deck or other flat surface. As non-limiting examples, the deck coupler 276 may be coupled to deck using screws, nails, adhesives, or other fasteners. The deck collar 277 may be coupled to the top of the deck coupler 276 and may be wider than the outside of the pole body 250 such that the deck collar 277 prevent the pole body 250 from sliding down past the top of the deck collar 277. The deck post adapter 278 may be coupled to the top of the deck collar 277 and may be substantially the same width as the interior of the pole body 250 such that the deck post adapter 278 may be inserted into the bottom of the pole body 250.

The invention 100 may further comprise one or more wall coupler strips 280. The one or more wall coupler strips 280 may be vertically-oriented double-sided fasteners. One side of an individual wall coupler strip may couple to the wall 910 and the opposite side of the individual wall coupler strip may couple to the leading edge 228 of the screen 220 or to the container support fastener 204. As a non-limiting example, an individual wall coupler strip may comprise one half of a hook and loop fastener 282 on one side to couple to the screen 220 and a self-adhesive strip 284 on the opposite side for attachment to the wall 910.

Figure 7:
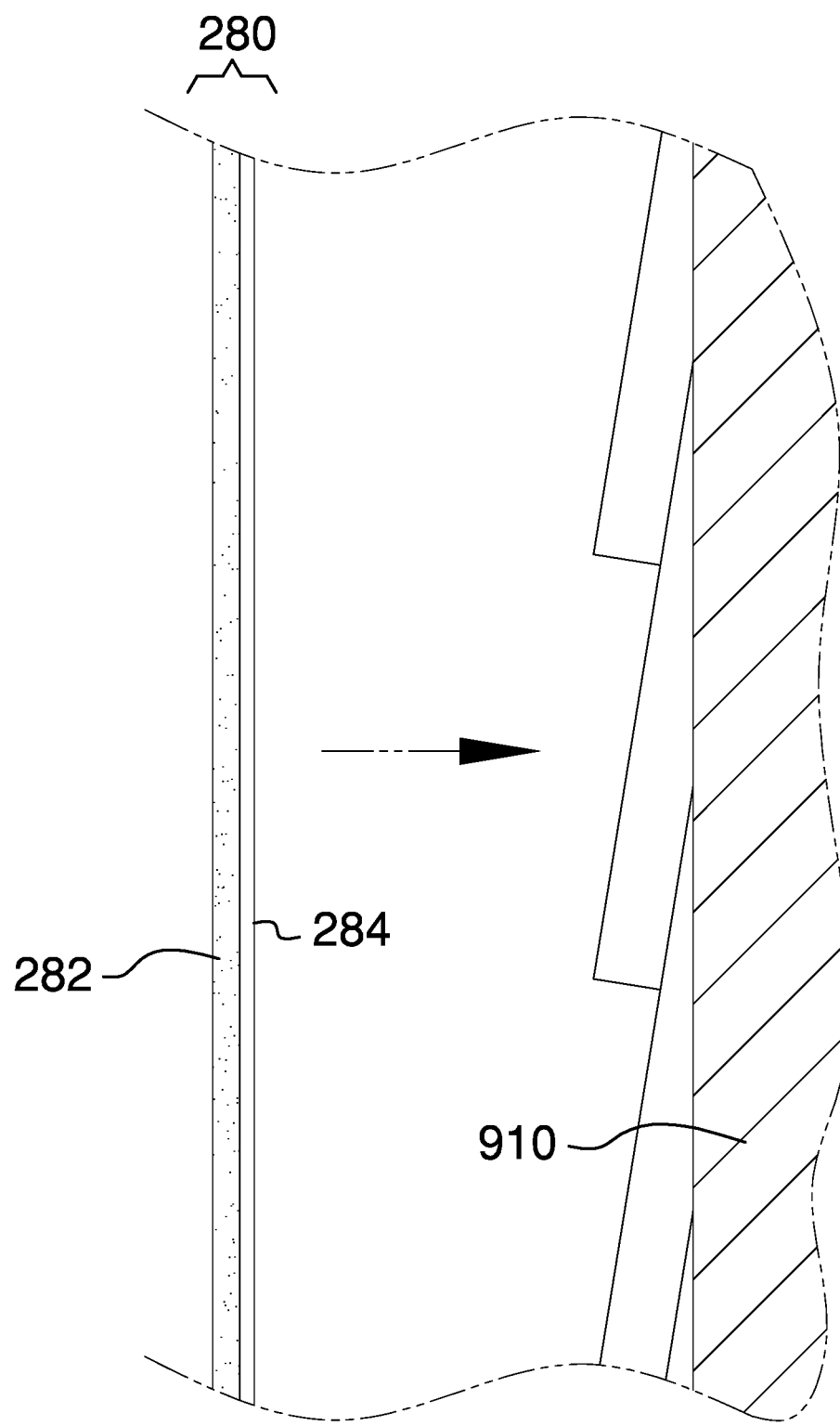
FIG. 7 is a details view of an embodiment of the disclosure illustrating a wall coupler strip attaching to a wall covered by siding.
Figure 8:
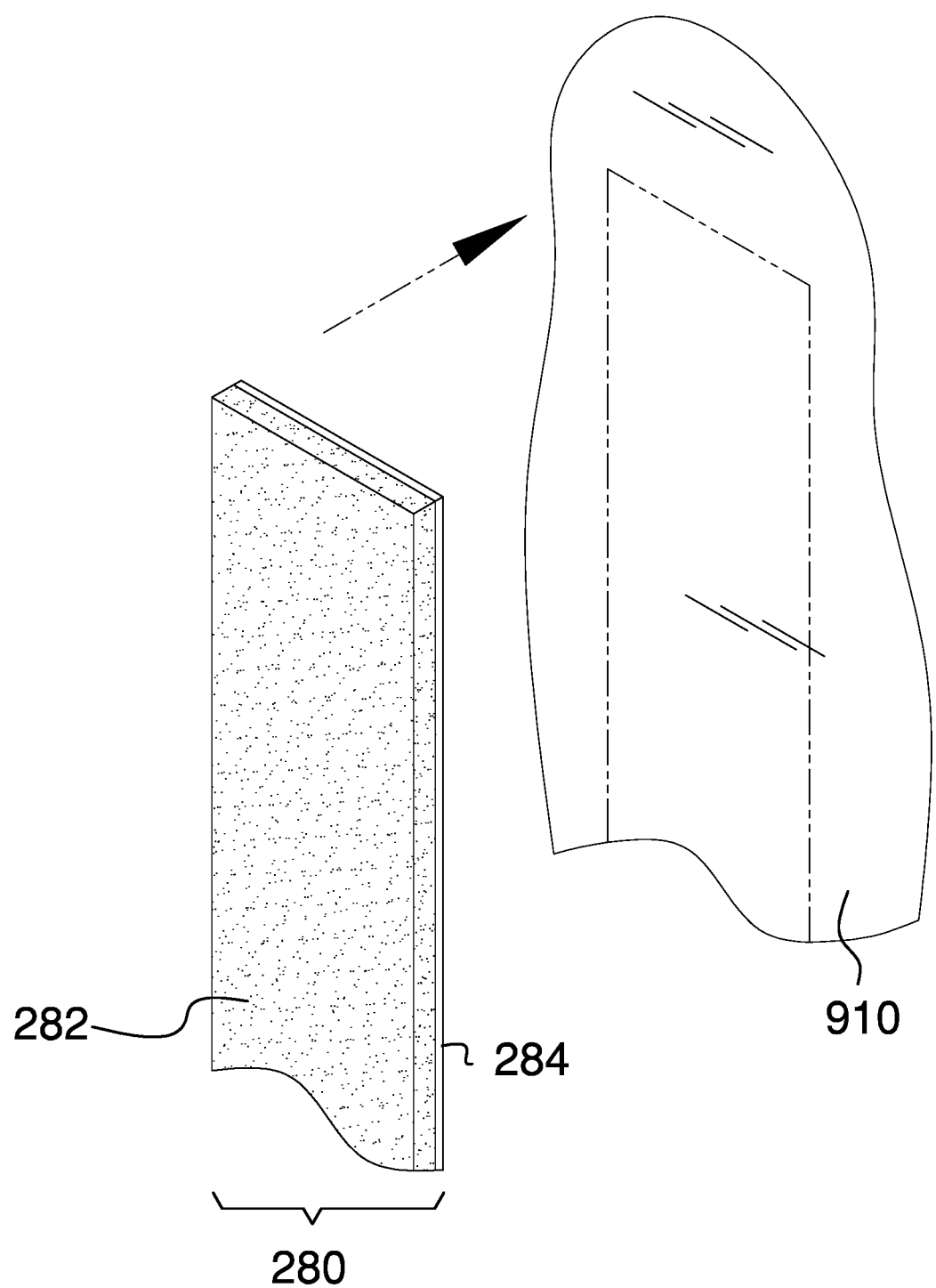
FIG. 8 is a perspective view of an embodiment of the disclosure illustrating a wall coupler strip attaching to a flat wall.

The one or more wall coupler strips 280 may be applied to a non-planar surface (as shown in FIG. 7) by flexing the individual wall coupler strip 280 to match the contour of the surface. As a non-limiting example, the non-planar surface may be vinyl siding on the side of a house. The leading edge 228 of the screen 220 may likewise be flexed to contact the wall coupler strip 280 such that the leading edge 228 of the screen 220 is held in place.

The container support fastener 204, the plurality of screen support fasteners 222, the pole support fastener 252, and the one or more wall coupler strips 280 may comprise one half of a hook and loop fastener. 'One half of a hook and loop fastener' may refer to either the hook strip or the loop strip of a hook and loop fastener with the understanding that any given fastener may be either the hook strip or the loop strip provided that the fastener that mates to the given fastener is the loop strip or the hook strip that complements the given fastener.

In use, a wall coupler strip 280 may be attached to a wall 910 and a cannister container 200 may be positioned such that a container support fastener 204 on the cannister container 200 couples to the wall coupler strip 280 to hold the cannister container 200 upright. A second wall coupler strip 280 may be attached to the wall 910 where a leading edge 228 of a screen 220 will be located. A plurality of support poles 230 may be positioned to outline the area where a pet is to be confined, separated by a pole separation distance 234. The screen 220 may be extended from within the cannister container 200 by pulling on the leading edge 228 of the screen 220. A plurality of screen support fasteners 222 on the screen 220 may be coupled to pole support fasteners 252 and a plurality of loops 226 below each of the plurality of screen support fasteners 222 on the bottom of the screen 220 may be placed onto a hook 262 on each of pole bases 260.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" refers to top and "lower" refers to the bottom. As a non-limiting example, the upper end of a vertical shaft is the top end of the vertical shaft.

As used herein, an "adapter" refers to a device that is designed to convert a first interface to a second interface. The conversion may require changes in mechanical shape or size, electrical signaling, power levels, pressures, or other physical attributes.

As used in this disclosure, the word "correspond" indicates that a first object is in some manner linked to a second object in a one to one relationship or that one or more properties shared by two or more objects match, agree, or align within acceptable manufacturing tolerances.

As used herein, the words "couple", "couples", "coupled" or "coupling", refer to connecting, either directly or indirectly, and does not necessarily imply a mechanical connection.

As used in this disclosure, a "cross-section" is a surface or shape that would be exposed by making a straight cut through an object.

As used in this disclosure, a "fastener" is a device that is used to join or affix two objects. Fasteners generally comprise a first element which is attached to the first object and a second element which is attached to the second object such that the first element and the second element join to affix the first object and the second object. Common fasteners include, but are not limited to, hooks, zippers, snaps, clips, ties, buttons, buckles, quick release buckles, or hook and loop fasteners.

As used in this disclosure, a "fence" is a barrier structure that encloses an outdoor space for the purposes of establishing a boundary or controlling access into or out of the enclosed space. The boundary formed by a fence may be referred to as a fence line.

As used in this disclosure, "flexible" refers to an object or material which will deform when a force is applied to it, which will not return to its original shape when the deforming force is removed, and which may not retain the deformed shape caused by the deforming force.

As used in this disclosure, a "hook" is an object that is curved or bent at an angle such that items can be hung on or caught by the object or such that the object may be suspended from another object.

As used in this disclosure, a "hook and loop fastener" is a fastener that comprises a hook surface and a loop surface. The hook surface comprises a plurality of minute hooks. The loop surface comprises a surface of uncut pile that acts like a plurality of loops. When the hook surface is applied to the loop surface, the plurality of minute hooks fastens to the plurality of loops securely fastening the hook surface to the loop surface.

As used in this disclosure, "horizontal" is a directional term that refers to a direction that is perpendicular to the local force of gravity. Unless specifically noted in this disclosure, the horizontal direction is always perpendicular to the vertical direction.

As used in this disclosure, the word "interior" is used as a relational term that implies that an object is located or contained within the boundary of a structure or a space.

As used in this disclosure, the word "lateral" refers to the sides of an object or movement towards a side. Lateral directions are generally perpendicular to longitudinal directions. "Laterally" refers to movement in a lateral direction.

As used herein, "mate" refers to coupling at a predefined interface.

As used herein, the word "portable" refers to a device that may be carried by a single person and may be used at multiple locations. In some cases, portable may imply that the device may be used while being carried.

As used in this disclosure, a "prism" is a 3 dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called that lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous the center axis of a cylinder. A prism wherein the ends are circles is commonly referred to as a cylinder.

As used in this disclosure, a "screen" is a meshed structure made of wire, yarn, cloth, synthetic materials, or combinations thereof that allows for the free flow of air but prevents larger objects from passing through the meshed structure.

As used in this disclosure, a "spring" is a device that is used to store mechanical energy. This mechanical energy will often be stored by deforming an elastomeric material that is used to make the device, by the application of a torque to a rigid structure, or by a combination thereof. In some embodiments, the rigid structure to which torque is applied may be composed of metal or plastic.

As used in this disclosure, a "stake" is a shaft that is driven into a horizontal surface, such as the ground, to serve as an anchor point.

As used in this disclosure, the term "strip" describes a long and narrow object of uniform thickness that appears thin relative to the length of the object. "Strips" are often rectangular in shape.

As used herein, the word "substantially" indicates that two or more attributes are the same except for a margin of error related to variances in materials, manufacturing processes, craftsmanship, installation, environmental conditions, or other factors that may influence the attributes and that the differences introduced by these factors are not considered detrimental to the operation of the invention as described herein.

As used in this disclosure, "vertical" refers to a direction that is parallel to the local force of gravity. Unless specifically noted in this disclosure, the vertical direction is always perpendicular to horizontal.

With respect to the above description, it is to be realized that the optimum dimensional relationship for the various components of the invention described above and in FIGS. 1 through 8, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A collapsible pet pen comprising:
a cannister container, a screen, and a plurality of support poles;
wherein the screen is deployed from within the cannister container and supported by the plurality of support poles;
wherein the cannister container and the screen are adapted to form a portable fence to confine a pet;
wherein the screen comprises a plurality of screen support fasteners;
wherein each of the plurality of screen support fasteners are a vertically-oriented coupling location for coupling the screen to one of the plurality of support poles;
wherein the screen comprises a plurality of loops;
wherein one of the plurality of loops is located at a bottom of the screen below each of the plurality of screen support fasteners.

2. The collapsible pet pen according to claim 1
wherein the cannister container is a panel that houses the screen;
wherein the cannister container has the shape of a rectangular prism;
wherein the cannister container comprises a first side panel and a second side panel;
wherein the cannister container comprises a first canister end which is coupled to a container support fastener;
wherein the cannister container is held upright by the container support fastener coupling to a wall of a building or to one of the plurality of support poles;
wherein the cannister container comprises a second canister end where the screen exits from the cannister container.

3. The collapsible pet pen according to claim 2
wherein a retractor is housed within the cannister container;
wherein the retractor pulls the screen intro the cannister container in the absence of an external force pulling the screen out of the cannister container.

4. The collapsible pet pen according to claim 3
wherein the retractor is one or more spring-loaded rollers mounted on vertically-oriented axis that tend to wrap the screen around rollers.

5. The collapsible pet pen according to claim 3
wherein the screen is a flexible barrier that is vertically-oriented when in use;
wherein the screen is rectangular;
wherein the width of the screen is larger than the height of the screen.

6. The collapsible pet pen according to claim 5
wherein the screen is fabric or mesh made from silk, nylon, cotton, Dacron, Kevlar, or combinations thereof.

7. The collapsible pet pen according to claim 5
wherein the plurality of screen support fasteners are regularly spaced along the width of the screen;
wherein the spacing between adjacent ones of the plurality of screen support fasteners are a pole separation distance;
wherein one of the plurality of screen support fasteners are located at a leading edge of the screen.

8. The collapsible pet pen according to claim 7
wherein the plurality of support poles are vertically-oriented armatures that support the screen and/or the cannister container;
wherein the plurality of support poles are placed in a yard or on a deck to define the area to be enclosed by the screen;
wherein the plurality of support poles are separated by the pole separation distance such that one of the plurality of support poles corresponds to each of the plurality of screen support fasteners on the screen;
wherein the screen couples to the plurality of support poles at each of the plurality of support poles;
wherein each individual support pole selected from the plurality of support poles comprises a pole body and a pole base.

9. The collapsible pet pen according to claim 8
wherein the pole body is as tall as the height of the screen;
wherein the bottom of the pole body is coupled to the top of the pole base;
wherein the pole body has a square horizontal cross-section;
wherein a pole support fastener is coupled to one or more lateral faces of the pole body;
wherein the pole support fastener couples to one of the plurality of screen support fasteners on the screen.

10. The collapsible pet pen according to claim 9
wherein the pole base holds the individual support pole in position in a yard or on a deck;
wherein the pole base comprises a hook.

11. The collapsible pet pen according to claim 10
wherein the pole base is a ground base that is driven into the ground to the individual support pole in place;
wherein the ground base comprises a stake, a ground collar, and a ground post adapter;
wherein the stake comes to a point on the bottom such that the ground base is driven into the ground;
wherein the ground collar is coupled to the top of the stake and is wider than the outside of the pole body such that the ground collar prevents the pole body from sliding down past the top of the ground collar;
wherein the ground post adapter is coupled to the top of the ground collar and is substantially the same width as the interior of the pole body such that the ground post adapter is inserted into the bottom of the pole body.

12. The collapsible pet pen according to claim 10
wherein the pole base is a deck base that is coupled to a deck or floor to the individual support pole in place;
wherein the deck base comprises a deck coupler, a deck collar, and a deck post adapter;
wherein the deck coupler has a flat bottom such that the deck base rests of the deck or other flat surface.

13. The collapsible pet pen according to claim 12
wherein the deck coupler is coupled to deck using screws, nails, adhesives, or other fasteners;
wherein the deck collar is coupled to the top of the deck coupler and is wider than the outside of the pole body such that the deck collar prevent the pole body from sliding down past the top of the deck collar;

wherein the deck post adapter is coupled to the top of the deck collar and is substantially the same width as the interior of the pole body such that the deck post adapter is inserted into the bottom of the pole body.

14. The collapsible pet pen according to claim 10 further comprising one or more wall coupler strips;
   wherein the one or more wall coupler strips are vertically-oriented double-sided fasteners;
   wherein one side of an individual wall coupler strip couples to the wall and the opposite side of the individual wall coupler strip couples to the leading edge of the screen or to the container support fastener.

15. The collapsible pet pen according to claim 14 wherein an individual wall coupler strip comprises one half of a hook and loop fastener on one side to couple to the screen and a self-adhesive strip on the opposite side for attachment to the wall.

16. The collapsible pet pen according to claim
   wherein the one or more wall coupler strips are applied to a non-planar surface by flexing the individual wall coupler strip to match the contour of the surface;
   wherein the leading edge of the screen is flexed to contact the wall coupler strip such that the leading edge of the screen is held in place.

17. The collapsible pet pen according to claim 16 wherein the container support fastener, the plurality of screen support fasteners, the pole support fastener, and the one or more wall coupler strips comprise one half of a hook and loop fastener.

* * * * *